April 28, 1964   R. J. WATSON   3,131,375
MULTIPLE REMOVAL SYSTEM
Filed Oct. 25, 1961   7 Sheets-Sheet 1

April 28, 1964 R. J. WATSON 3,131,375
MULTIPLE REMOVAL SYSTEM
Filed Oct. 25, 1961 7 Sheets-Sheet 5
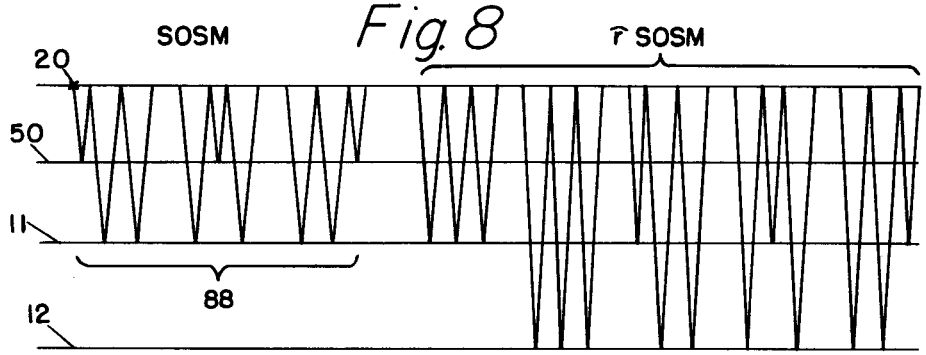
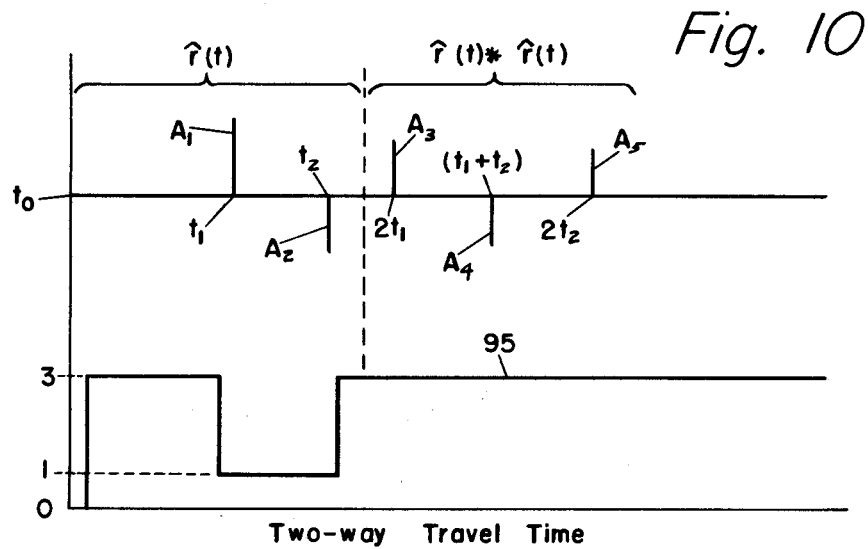
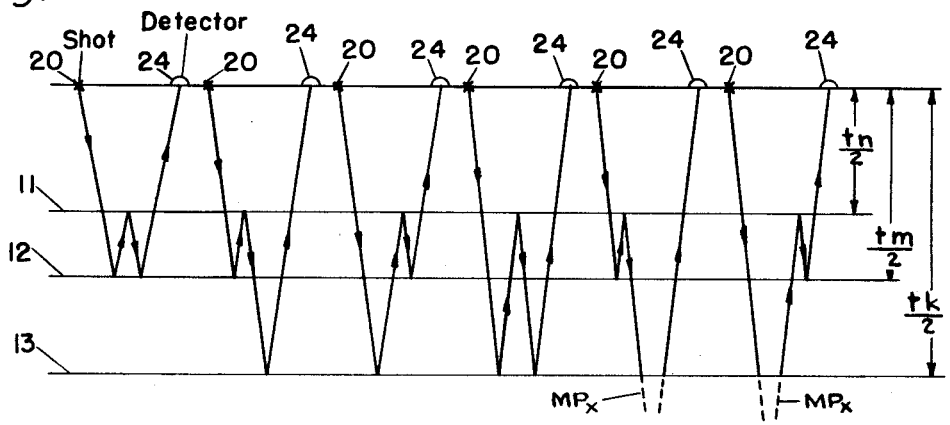

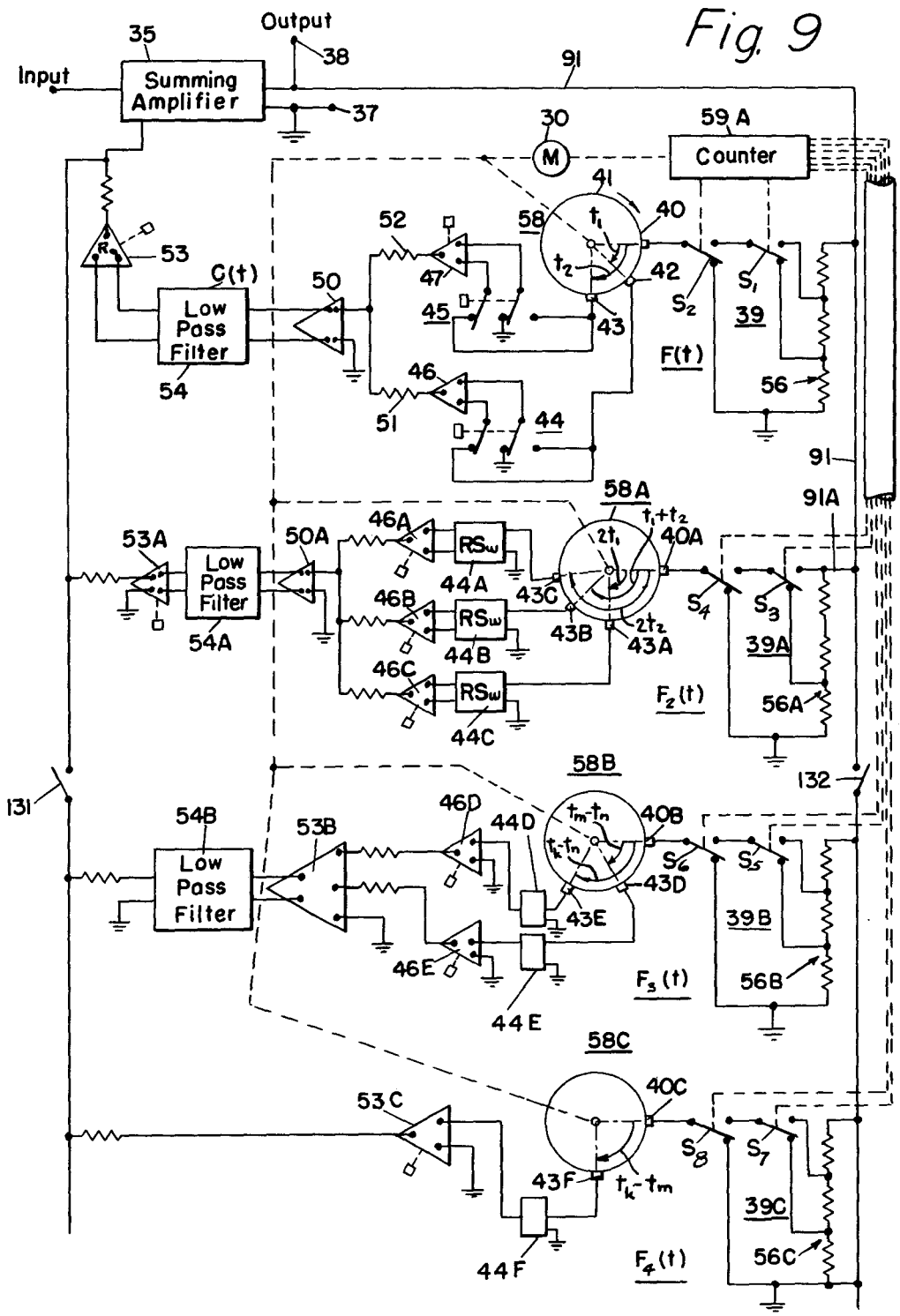

April 28, 1964          R. J. WATSON          3,131,375
MULTIPLE REMOVAL SYSTEM
Filed Oct. 25, 1961          7 Sheets—Sheet 7
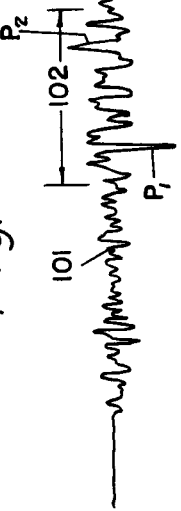
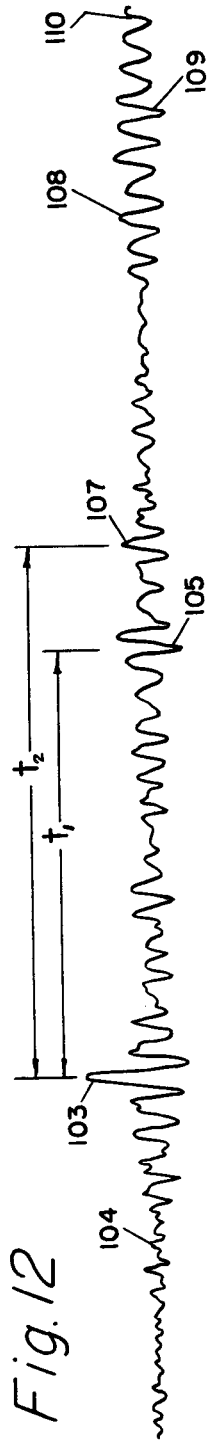
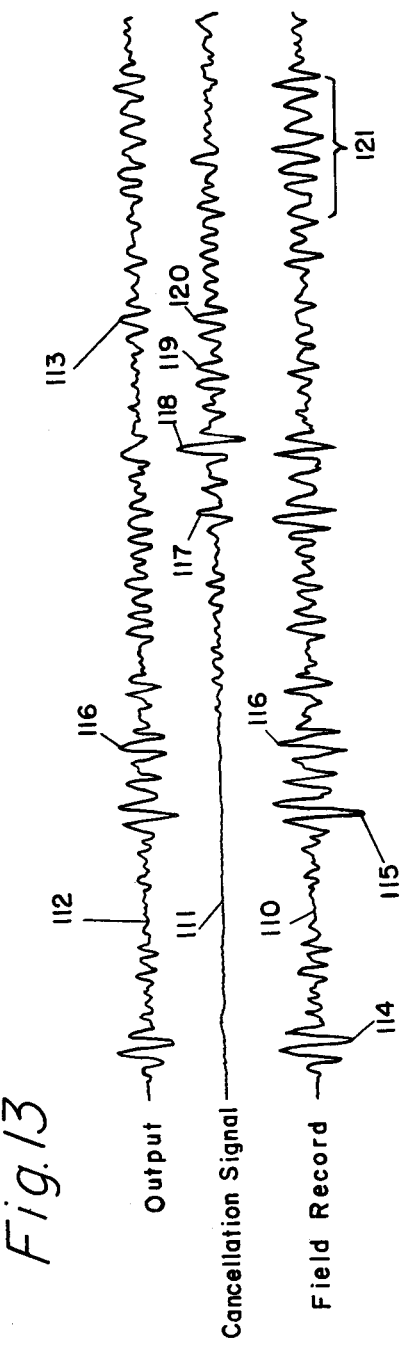

United States Patent Office 3,131,375
Patented Apr. 28, 1964

3,131,375
MULTIPLE REMOVAL SYSTEM
Robert J. Watson, Dallas, Tex., assignor to Socony Mobil Oil Company, Inc., a corporation of New York
Filed Oct. 25, 1961, Ser. No. 147,588
20 Claims. (Cl. 340—15.5)

This invention relates to methods of and systems for the treatment of seismic data as appearing on seismograms and has for an object the provision of methods of and apparatus for the elimination from such seismograms of multiples originating from subsurface interfaces located below the source of generation of seismic signals.

In seismic exploration, acoustic energy generated by the production of seismic impulses such as from weight-dropping techniques or as the result of detonation of a charge of dynamite are detected after reflection from subsurface beds to produce seismograms. The seismic signals, by reason of the time occurrence of reflection components, provide information as to the depth and attitude of such beds. Those skilled in the art are well aware of the fact that a part of the seismic energy is not only reflected upwardly from subsurface interfaces but that that reflected energy upon arrival at the earth-air boundary is also reflected downwardly, thus giving rise to additional reflections which may have arrival times coinciding with primary reflections. These additional reflections are frequently referred to as surface multiples in that each has a reflection occurring at the earth-air boundary or at the base of the weathered zone.

It has been determined that multiples due to a single reflection at a near-surface bed of high velocity-density contrast, as at the earth-air boundary itself, have an amplitude of a greater order than internal multiples, i.e., those which do not include the reflection from the almost perfect reflector at the near-surface interface. When there are three bounces, one of which occurs at the surface or near-surface interface, the resultant reflection signals will be referred to herein as first order surface multiples, and in many instances abbreviated FOSM.

Though not limited thereto (and systems for the removal of internal multiples have been disclosed), the present invention has for its principal object the elimination from the seismogram of surface multiples. In carrying out the invention in one form thereof, there are generated cancellation signals by time-domain filtering of selected portions of the seismogram. More particularly, there is first eliminated from the time-domain filter the initial portion of the seismogram including the first break due to the direct traveling wave from the shotpoint to the detector. By time-domain filtering a remaining, selected, portion of the seismogram, that part of the seismogram is convolved with a reflectivity function of character giving rise to said multiples. The filtering operation in terms of the filtering characteristic is determined by the magnitudes of the velocity-density contrast of the interfaces located below the source of generation of the seismic signals and selected by reason of their substantial contribution to record-obscuring multiples. The time delays of the filtering operation exactly correspond with the time occurrence of a multiple on the seismogram relative to its associated primary signal, though in some instances a close approximation of that time will for the most part helpfully remove multiples from the seismogram. The output from the time-domain filtering in generation of the cancellation signals is then modified by two factors: first a reflectivity coefficient, and second a convolution of that modified output with a function of character representative of the difference between the filtering action of the earth upon the seismic energy giving rise to the respective primary reflections and upon their multiples. By continuously applying said last-named cancellation signals to said seismogram in opposite phase with respect to the phase of said multiples and in time coincident therewith, there is produced a seismogram free of said multiples.

For further objects and advantages of the invention and for additional basic theory underlying the same, reference is to be had to the following detailed description taken in conjunction with the accompanying drawings, in which:

FIG. 1 diagrammatically illustrates a section of the earth's surface together with ray paths useful in explaining the invention and includes a representation of a velocity log;

FIG. 2 illustrates a selected portion of a seismogram as well as a velocity log plotted against two-way travel time and values selected therefrom;

FIG. 3 diagrammatically illustrates one system embodying the present invention;

FIG. 4 diagrammatically illustrates a section of the earth's surface together with ray patterns helpful in explaining the operation of the invention;

FIG. 5 includes a switch-timing graph together with typical waveforms produced by a detector as a result of selected reflection of energy from certain of the ray patterns of FIG. 4;

FIG. 8 illustrates additional waveforms helpful in understanding the invention;

FIG. 9 diagrammatically illustrates an additional embodiment of the invention including a wiring diagram;

FIG. 10 illustrates both the results of a cross-correlation operation and an associated switch-timing diagram;

FIG. 11 illustrates a typical seismogram;

FIG. 12 illustrates a graphical plot of the result of the cross-correlation operation performed on that seismogram;

FIG. 13 illustrates a typical seismogram, the generated cancellation signals, and the resultant demultipled seismogram; and FIG. 14 is a still further ray diagram of seismic energy giving rise to multiples of the kind which may be eliminated in accordance with the present invention.

Figure 1:
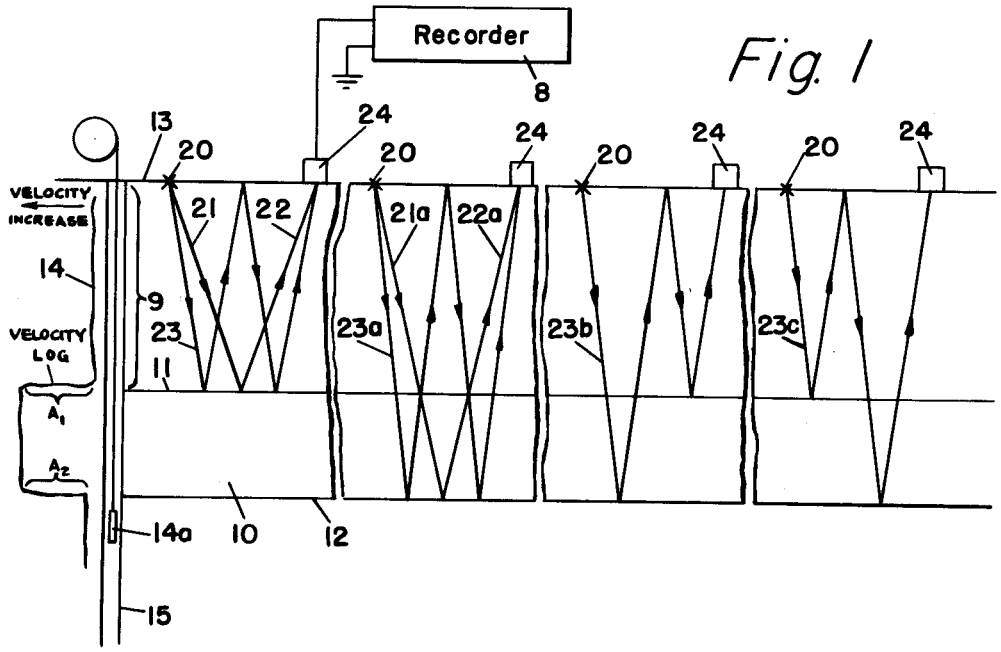

For ease in explaining the invention there will first be considered an idealized simple case, such as shown in FIG. 1, where a subsurface reflecting bed 10 of substantial thickness has an upper interface 11 and a lower interface 12, respectively, of high velocity-density contrast with the earth sections above and below them. If a charge of dynamite be detonated at the surface as at the shotpoint 20 (or seismic energy otherwise generated as by weight-dropping techniques), seismic energy will travel downwardly from the shotpoint 20 as represented by the ray path 21. At the interface 11, energy will be reflected upwardly as indicated by the ray path 22 to a detector 24. This will be the primary reflection $P_1$ of FIG. 2. Meanwhile, there will have arrived at the detector or geophone 24 a direct traveling wave from the shotpoint. Seismic energy from the shotpoint will likewise produce multiples from interface 11, one of them ($MP_1$ of FIG. 2), arising from the ray paths illustrated of which the path 23 is the first of this three-bounce first order surface multiple. The angularities of the illustrated ray paths assist in distinguishing between the primary reflections and first order surface multiples. It is to be understood that the shot-detector distance in practice will be so small relative to the depth of the reflecting interfaces that all travel paths may be considered to be vertical. Further to assist in following the phenomenon that takes place, there have been repeated in FIG. 1 additional illustrations of the location of the shotpoint 20 and the detector 24 together with additional ray-path diagrams. To represent the actual case, these additional diagrams would all overlie the initial one. More particularly, seismic energy from the shotpoint 20 will produce a second primary reflection $P_2$ by way of the ray path 21a to the interface 12 and thence by ray path 22a to the detector 24. A second multiple $MP_2$ arises due to a three-bounce FOSM due to the three bounces, of which the ray path 23a is the initial one.

Additional first order surface multiples may be produced, the initial ray paths 23b and 23c thereof being shown. It is to be noted that as to these last two first order surface multiples, the travel times from shotpoint 20 to detector 24 will be the same. Accordingly, they will arrive together at the detector 24 to produce a multiple which may be designated $MP_{12}$ and $MP_{21}$, the subscripts indicating that the initial reflection of one is from one of the interfaces, while the initial reflection from the other is from the other interface.

Figure 2:
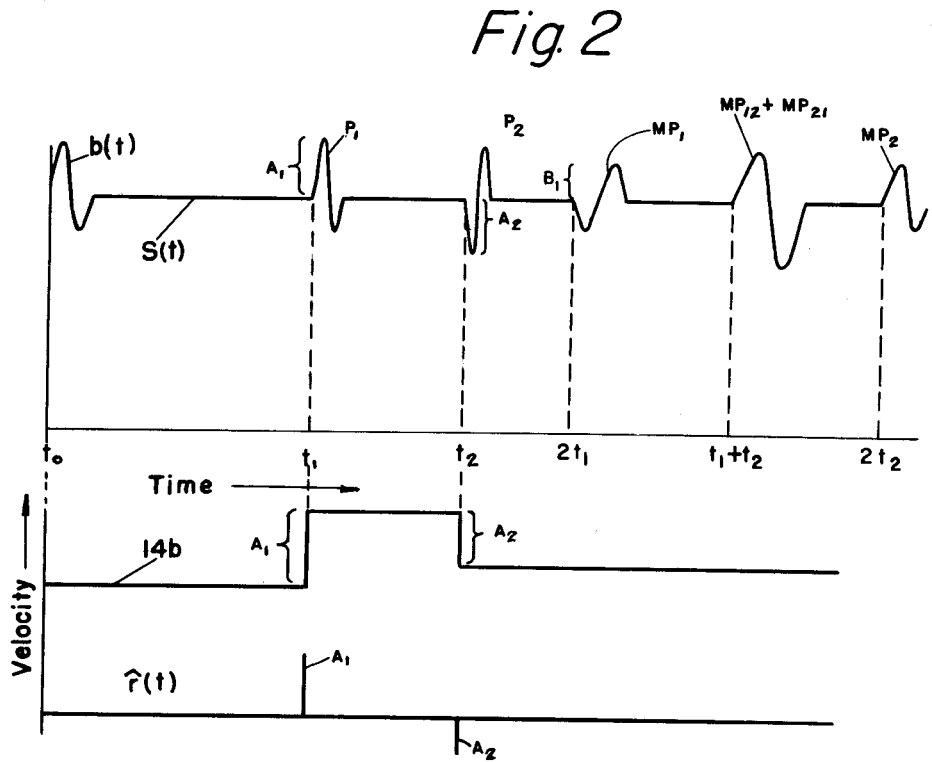

With the above understanding of the idealized case, it will be seen, FIG. 2, that the aforesaid phenomenon will produce on a seismogram $S(t)$ the direct traveling wave $b(t)$, the first reflection $P_1$ from interface 11, the second reflection $P_2$ from interface 12, and the multiples $MP_1$ ($MP_{12}+MP_{21}$), and $MP_2$. The seismogram is shown with the time scale from $t_0$ to a time exceeding $2t_2$.

In FIG. 1 there has been illustrated a borehole 15 in proximity to the shotpoint 20 and to the detector 24. In some regions of exploration, such boreholes will be available and velocity logs in terms of depth versus amplitude may be made as by a logging tool 14a for production of a velocity log 14, the amplitude excursions at $A_1$ and $A_2$ illustrating velocity contrasts at the interfaces 11 and 12. The information on such a velocity log may be converted as illustrated by the graph 14b of FIG. 2 to velocity as ordinates versus two-way travel time as abscissae to provide the same time-base as for the reflections appearing in FIGS. 1 and 2. One way of accomplishing such a conversion is fully explained in co-pending application Serial No. 592,925, filed June 21, 1956, entitled "Conversion of Velocity Well-Logging Data," now Patent No. 3,008,120, and assigned to the same assignee as the present invention. As well understood by those skilled in the art, the logging tool 14a may comprise a single transmitter with two receivers spaced vertically at different distances from the transmitter. Thus by measuring the difference in time, designated $\Delta t$, required for acoustic energy to travel from the transmitter to the far receiver and that required for the acoustic energy to travel to the near receiver, there may be applied the equation:

$$U = \frac{K}{\Delta t}$$

where:

$U$=velocity of the acoustic energy through the distance K corresponding with the spacing between the two receivers.

By integrating the incremental travel time with respect to depth or position of the logging instrument in the borehole 15, there will be obtained total travel time required for the acoustic energy to travel from the top to the several subsurface reflecting interfaces of the earth section under study. Having determined total travel time, it is only necessary to introduce a doubling factor to produce the desired output of two-way travel time for the abscissae of the plot $\hat{r}(t)$ of FIG. 2.

With the idealized seismogram $S(t)$ available in reproducible form as from a recorder 8, shown in FIG. 1 connected to detector 24, the necessary steps may now be taken to remove from the seismogram the illustrated first order surface multiples.

Figure 3:
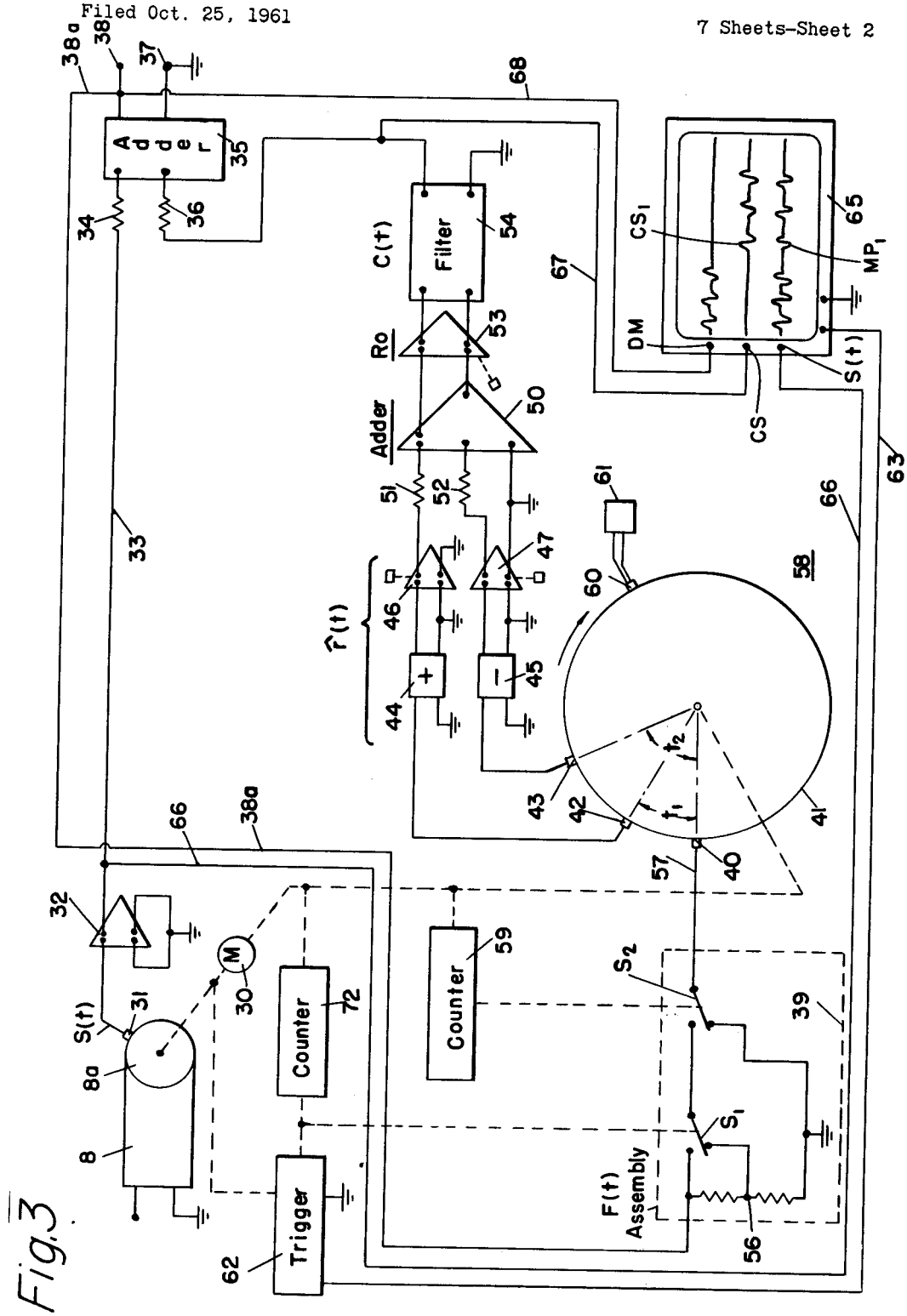

Referring now to FIG. 3, the recorder 8, which may be either located in the field or in the processing laboratory, has been illustrated as including a drum 8a having thereon a magnetic tape and an associated pickup head 31 for repetitive reproduction of the seismogram $S(t)$ and for applying the detected signals to an amplifier 32. The output of the amplifier 32 is applied by conductor 33 and resistor 34 to a summing amplifier or adder 35 having output terminals 37 and 38. By means of a plurality of components now to be described, there will be generated cancellation signals which when introduced by way of a summing resistor 36 to the summing amplifier 35 will eliminate from the seismogram as it appears at the output terminals 37 and 38, the first order surface multiples of FIG. 2. Thus as the seismogram is reproduced, signals generated or representative thereof are applied by way of a conductor 38a to a switching assembly 39 providing a gain adjustment or function $F(t)$ and including a single-pole, double-throw switch $S_1$ which in the illustrated position completes a connection to an attenuator 56. There is a second single-pole, double-throw switch $S_2$ which in the illustrated position connects to ground an input conductor 57 and the recording head 40 of a time-domain filter 58. The switches $S_1$ and $S_2$ are operated by counters 72 and 59, mechanically driven by a motor 30 which is also utilized to drive the drum 8a and a drum 41 of the time-domain filter 58. After the direct traveling wave $b(t)$ of FIG. 2 has appeared at the output terminals 37 and 38 and before arrival of the first primary reflection $P_1$, the switch $S_2$ is operated by counter 59 to open its lowermost contacts and to close its uppermost contacts for applying to a magnetic tape carried on the drum 41 as by the recording head 40 a signal representative of the primary reflection $P_1$.

The time-domain filter 58 is provided with a plurality of pickup heads, two of which, the heads 42 and 43, have been illustrated as angularly separated from a recording head 40 by distances which in terms of travel time on the seismogram of drum 8a correspond, FIG. 2, with the times $t_1$ and $t_2$. In FIG. 2 the times $t_1$ and $t_2$ have been taken at the first breaks of the primaries $P_1$ and $P_2$. Such times have been shown to be identical with the appearance of the amplitude changes $A_1$ and $A_2$ of the velocity log 14a. The foregoing times correspond and may be accurately determined in the idealized case under discussion. For the more general case there will be later set forth another technique of ascertaining the times $t_1$ and $t_2$. In this connection it is emphasized that the delay time $t_1$ as it appears in FIG. 3 is explicitly the time between the first reflection $P_1$ and the appearance on the seismogram of its multiple $MP_1$. It is only in the idealized case that $t_1$ as appearing in FIG. 3 will be equal to the time of occurrence of the primary reflection $P_1$. It is similarly emphasized that only in the idealized case will the time $t_2$ as appearing in FIG. 3 be equal to the time occurrence of the second primary reflection $P_2$. Continuing, however, with the idealized case and remembering that the drums 8a and 41 are interconnected mechanically and rotate together, the time from zero to $t_1$ as appearing in FIG. 2 will elapse before there is applied to the recording head 40 the primary reflection $P_1$. Thereafter and after the expiration of the time interval $t_1$ as appearing in FIG. 3, that primary signal $P_1$ will be detected by the pickup head 42. Thus at the time the primary reflection appears at the pickup head 42, the first multiple $MP_1$ will appear at the summing amplifier 35 there to be eliminated by the cancellation signal generated from the aforesaid detected primary reflection. That cancellation signal is generated as follows.

The detected primary reflection $P_1$ is applied by way of a reversing switch 44 to an amplifier 46. The output from the amplifier 46 is applied by way of a summing resistor 51 to a summing amplifier 50 and thence to an amplitude-changing amplifier 53 for introduction of a correction factor due to the reflectivity of the surface or near-surface interface. The amplifier 53 applies its output to a function generator 54 which may be in the form of a low-pass filter with the output thereof applied to the summing resistor 36 as a cancellation signal characterized by the fact it is of opposite phase to the multiple $MP_1$ and in time coincidence therewith to remove from the seismogram $S(t)$ the multiple $MP_1$.

The primary reflection $P_1$, after time $t_2$ as appearing in FIG. 3, is detected by the pickup head 43 and applied by way of a reversing switch 45 to an amplifier 47 which applies through summing resistor 52 its output as the input to the amplifier 50. It will now be obvious that as the second primary reflection $P_2$ is recorded by the recording head 40 it will later be detected by the pickup heads 42 and 43 and applied by way of the reversing switches to the amplifiers 46 and 47.

It will be observed from the idealized seismogram $S(t)$ of FIG. 2 that the waveform of the primary reflection $P_1$ comprises a positive-going portion followed by a negative-going portion. With a positive-going primary and with a resultant negative-going first order surface multiple, the reversing switch 44 will be set in a position for the development at the summing amplifier 35 of the needed cancellation signal of opposite phase to that of the multiple $MP_1$. For simplification, this polarity has been indicated as positive for the reversing switch 44. In similar manner, the reversing switch 45 has been set to the opposite position as indicated by the negative sign and for the reason that the initial portion of the second primary reflection $P_2$ is negative-going while its corresponding multiple has a positive-going initial portion.

In addition to the adjustment of the pickup heads 42 and 43 to positions on drum 41 proportional to the time intervals $t_1$ and $t_2$, the amplifiers 46 and 47 are by suitable gain control means (indicated by the adjusting knobs) respectively set to predetermine the gain to be proportional to the amplitudes $A_1$ and $A_2$ of the primary reflections $P_1$ and $P_2$. It has been determined that the reflectivity function of the earth at the location being investigated will be realized in the time-domain filter 58 by the aforesaid settings, including of course the correct positioning of the polarity-determining switches 44 and 45.

The gain of the amplifier 53 is set to introduce the factor corresponding with the surface reflection coefficient $R_0$. To a close approximation, the setting can be determined as follows. Since the primary reflection $P_1$ (and the same analysis applies to other primaries and their multiples) appears in FIG. 2 with an amplitude of $A_1$, and since one of its multiples, the multiple $MP_1$, appears with an amplitude $B_1$, it will be seen that the amplitude $A_1$ will be proportional to the reflection coefficient $R_1$ of interface 11. If a proportionality constant K be introduced, then $A_1 = KR_1$. Similarly, for the amplitude for the multiple $MP_1$, $B_1 = KR_0R_1R_1$. Obviously since $R_1$ is known and $B_1$ is known, the equation may be solved for $R_0$. Hence the amplifier 53 will be set to a value proportional to $R_0$. In practice, the setting of the gain by the knob for amplifier 53 will not only include the reflection coefficient $R_0$, but will additionally have a setting to make up the losses in the corrective circuit as may occur, for example, in the recording and reproduction of the signals from the tape on drum 41 as well as other attenuation thereof.

Remembering now that in point of time, the next-appearing multiple will be the sum of the two multiples represented by the ray paths identified by the initial paths 23b and 23c, it will be seen that as the primary reflection $P_1$ arrives at the pickup head 43, the second primary reflection $P_2$ will have arrived at the pickup head 42. Thus the two primary reflections will in time coincidence be applied to the amplifiers 46 and 47 and thus they will be added together by the summing amplifier 50 and the resultant signal applied to the amplifiers 53 and 54 to complete the generation of the cancellation signal for the multiple $MP_{12} + MP_{21}$. Following the removal of the last-mentioned multiple, the second primary reflection $P_2$ will appear at the pickup head 43 and in a manner similar to that described will produce at the summing amplifier 35 the needed cancellation signal to eliminate the third first order surface multiple $MP_2$ from the seismogram. If there be connected to output terminals 37 and 38, as there generally will be in practice, a recorder with a selected recording medium such as magnetic tape or an instrument for producing a conventional seismogram, it will be found that the seismogram will be free of the first order surface multiples illustrated in FIG. 2.

In practice, there may be many more detecting heads, the plurality illustrated being representative. Following the last of the pickup heads, there is provided an erase head 60 energized from a suitable erasing circuit 61 in order to clear the tape on drum 41 of the signals already utilized in producing the multiple-free record.

The $C(t)$ Filter

Aside from the phase reversal, the difference between the wave shapes of the primary $P_1$ and its multiple $MP_1$ is due to the differing wave paths taken by the seismic energy and the resulting differing modification thereof by the strata through which such seismic energy travels. Thus the function $C(t)$ may be defined as that needed to modify the shape of the waveform representative of the primary reflection $P_1$ to that of its multiple $MP_1$ in order to achieve complete cancellation of the multiple from the seismogram. In practice, it has been found that the difference in the shapes of the two waveforms is largely due to a difference in the high frequency components contained in the two waveforms. Accordingly, the needed $C(t)$ filter may be closely appoximated by a filter of the low-pass type thus to remove some of the high frequency content of the primary $P_1$ and to transform the shape thereof to that of its multiple $MP_1$. In the idealized case and for many practical applications of the invention, there will be utilized a low-pass filter of the adjustable type. Filters of the foregoing type are well known to those skilled in the art and they can take many forms. In one embodiment of the invention, the low-pass, high-cut filter had an attenuation of 18 db per octave and an exemplary setting was in the range to remove frequencies above about 50 cycles per second, though it is understood that the settings for different locations will range above and below a value of 50 cycles per second. The particular setting of the filter $C(t)$ for a given operation will be readily realized by displaying on an oscilloscope 65 the seismogram $S(t)$. For this purpose there is provided an input connection from the output of amplifier 32 by way of conductor 66 for display of the seismogram $S(t)$ on the lower trace. It will be remembered that the drum 8a is continuously rotated by a motor 39. Thus for display of the seismogram $S(t)$ on the lower trace of the oscilloscope 65, a trigger device 62 may be operated from the motor shaft to initiate a scanning operation each time the leading end of the seismographic record appears beneath the pick-up head 31. Such trigger devices are well known to those skilled in the art. The trigger pulse from the trigger device 62 is applied to the oscilloscope by way of conductor 63.

The corrective signal as developed at the output of filter 54 is applied to the oscilloscope 65 by way of conductor 67 to display that signal on the CS trace. For convenience there is also displayed on the oscilloscope 65 the demultiplied seismogram, the input for the trace DM extending by way of conductor 68 from the output terminal 38. Inasmuch as the multiple $MP_1$ appears on the $S(t)$ trace, the corrective signal may be displayed on the CS trace in the same phase by simply reversing the positions of the switches 44 and 45. Thus there may be a direct visual comparison of the wave shape $MP_1$ and the cancellation wave $CS_1$. On the upper DM trace under such circumstances, the multiple $MP_1$ and the cancellation signal will be additive and will produce a resultant signal of double amplitude. To check the adjustments of the filter, the switches 44 and 45 are then reversed and on the upper trace DM the multiple $MP_1$ will entirely disappear if the filter $C(t)$ then be in proper adjustment. Some adjustment of the gain of amplifier 53 may also be required since this amplifier not only makes up for loss of signal in the preceding operations but also introduces a correction corresponding with the reflectivity function $R_0$ at the earth's surface. This function is later discussed in detail.

The foregoing procedure has worked well in practice but a different approach may be utilized when desired. Since the $C(t)$ filter 54 is to modify the cancellation signal $CS_1$ to be equal and opposite to the multiple $MP_1$ and since this stated result may be achieved by modification of the primary signal $P_1$ in the signal generating loop to be equal and opposite to the multiple $MP_1$, the methods set forth in Neufeld Patent 2,696,891 are applicable. More particularly, there will be made a harmonic analysis of the two waveforms $P_1$ and $MP_1$ as shown by Neufeld in his FIGS. 17 and 18 to produce the phase and amplitude spectra thereof. The results of the analysis will then be utilized as indicated in his FIG. 19 to produce the phase and amplitude spectra of the difference between the two functions, one the primary reflection $P_1$ and the other multiple $MP_1$. With this information of the phase and amplitude spectra, there may be then readily achieved the parameters needed to set up the filter $C(t)$ to produce the needed modification in the primary reflection to make it equal to that of its multiple $MP_1$. In this connection, those skilled in the art understand quite well how to synthesize the needed filter of the low bandpass type having at hand the phase and amplitude spectra which delineated the needed filter characteristics.

Figure 4:
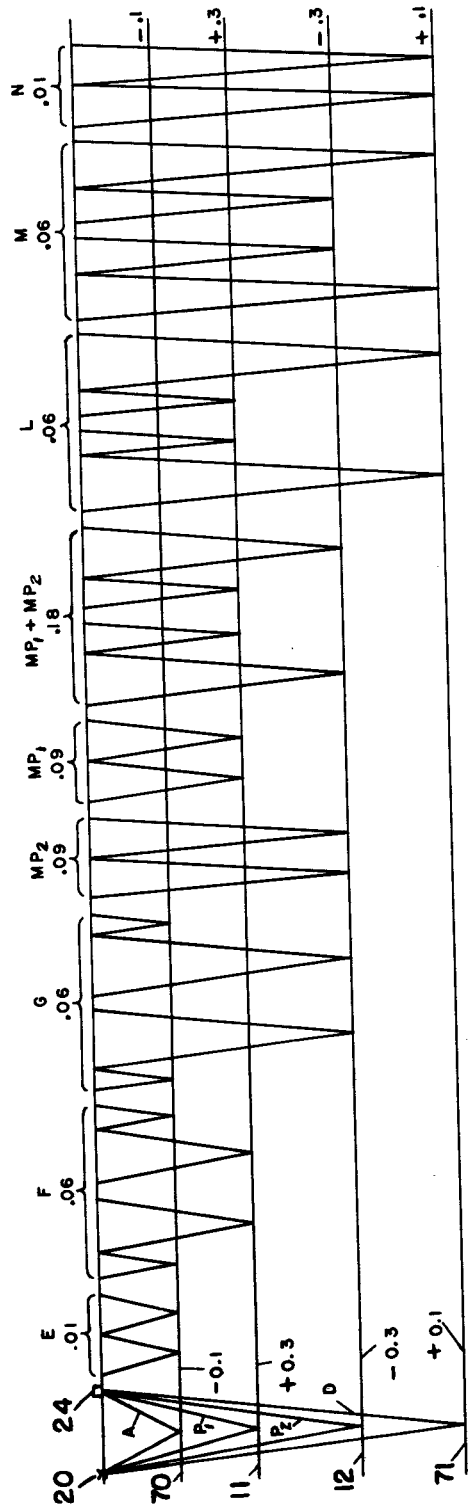

So far, the idealized case illustrated in FIGS. 1 and 2 has been under discussion. Such an idealized case will seldom be encountered in practice. Though still idealized to some extent, nevertheless FIG. 4 diagrammatically illustrates not only subsurface reflecting interfaces 11 and 12, but also additional reflecting interfaces 70 and 71. In practice, there will usually be encountered a multiplicity of beds with differing reflection coefficients. Where the reflection coefficients are relatively high, thus giving rise to multiples of substantial magnitude and particularly when including a single bounce at the surface, there will be utilized a pickup head on drum 41 of FIG. 3 for each of the stronger multiple-generating horizons. In FIG. 4 the several wave paths have been illustated in the same way as in FIG. 3, but taking into account the additional reflecting horizons or interfaces 70 and 71. These interfaces 70 and 71 will be assumed to have reflection coefficients of magnitude 0.1 with reflection coefficients for interfaces 11 and 12 both assumed to be of magnitude 0.3. In practice, the ray paths are superimposed one upon the other and all are considered to be vertical paths. FIG. 4 is further idealized in that the shotpoint 20 is taken at the surface. This simplifies the discussion of time factors since in the practical application of the invention the dynamite charge will generally be placed in a shothole extending to the base or somewhat below the weathered layer. Time corrections for that location are well understood. In FIG. 4 there again appear the ray paths for the primary reflections $P_1$ and $P_2$ together with the multiples $MP_1$ and $MP_2$ and the summation multiple $MP_1+MP_2$. Beneath the reference characters there appear the decimal values representative of the relative magnitudes or amplitudes of the signals resulting from seismic energy traveling the illustrated paths. For the purposes of this discussion, the reflection coefficient at the earth-air boundary will be assumed to the unity. The maximum amplitudes of the primary reflection signals $P_1$ and $P_2$ as appearing in FIG. 5 will have relative magnitudes of 0.3 corresponding with the high-valued reflection coefficients of the beds 11 and 12. The multiple of maximum amplitude will be the summation multiple. It will have a value of 0.18 while that of multiples $MP_1$ and $MP_2$ will have relative amplitudes of 0.09. The waveforms of the multiples and the primary signals have been shown in FIG. 5.

From the interface 70 with an assumed reflection coefficient of 0.1, there will of course be produced a primary signal A with a relative amplitude of 0.1. For the primary A, there will be a multiple E which bounces twice from the interface 70 and thus has an amplitude of 0.01, an amplitude 1/9 of that of multiples $MP_1$ and $MP_2$. It is of such low order that it may be neglected in terms of need to remove it from the seismogram. Similarly, there may be neglected all multiples arising from double bounces on interfaces having reflectivity coefficient of a correspondingly low order. However, for a multiple arising by reason of a single bounce from interface 70 and a single bounce from either of the reflecting interfaces 11 and 12, a different situation arises. Thus the multiple F will have an amplitude of 0.06 and for the reason that this multiple appears as a summation multiple since the seismic energy traverses two paths of equal length, the first including a bounce from the interface 70 followed by a bounce from the interface 11, with the intermediate bounce at the surface, while the second portion of the summation multiple F has its first bounce from interface 11 followed by one at the surface and then from the interface 70. In accordance with the present invention, this summation multiple F is eliminated by reason of the operation of the function switch $F(t)$. Before discussing the operation of switch $F(t)$, however, it may be observed that there has been neglected in the above explanation in FIG. 4 seismic energy loss due to the transmission thereof through reflecting interfaces. The above-discussed theory is nevertheless explicity correct since it can be assumed that the reflection coefficients shown with each reflection bed are transmission-corrected coefficients.

Referring now to the summation multiple $MP_{12}+MP_{21}$ of FIG. 2, it will be recalled that there was cancellation of this summation multiple by reason of the fact that the waveforms or signals representative of the primaries $P_1$ and $P_2$ respectively arrived at the pickup heads 43 and 42 in time coincidence with the appearance of the summation multiple at the summation amplifier 35. However, for the summation multiple F of FIG. 4, there will not be time coincidence between two primary reflections at pickup heads 42 and 43 to provide the double amplitude signal needed to produce a corrective signal of double amplitude and of the kind needed to cancel the summation multiple F of FIGS. 4 and 5.

This time coincidence is lacking in the system of FIG. 3, since there is not provided the additional pickup head for the primary reflection A. Thus while a primary reflection, such as primary A, can be of such a low order as to be neglected, nevertheless its summation multiple, such as the multiple F, may have an amplitude to require its removal.

It will be remembered that in describing the operation of FIG. 3 for the idealized case of FIGS. 1 and 2, the switch $S_1$ was described as being in its illustrated position, and it was not described as operated from that position. In the illustrated position of FIG. 3, a connection is completed from the attenuator 56 to one terminal of the switch $S_2$. Thus in the illustrated position and with the resistance values of the attenuator resistors assumed to be equal, one-half of the input signal on conductor 38a appears on the input conductor 57 after operation of the switch $S_2$ to its upper position. However, it will be remembered that amplifier 53 is adjusted to take care of attenuation of the input signals and specifically to assist in producing a cancellation signal $CS_1$ as shown on trace CS of amplitude equal and opposite to reflection $MP_1$. Thus the gain of amplifier 53 will for one-half of the input signal restore that input signal to its original amplitude. The result is that there occurs double amplification of the input signals applied by conductor 38a with switch $S_1$ in its uppermost position.

From the foregoing, it will be seen that with counter 72 utilized to operate the switch $S_1$ to its uppermost position just prior to the appearance of the primary signal A at the output of the summing amplifier 35, there will be applied to the recording head 40 a signal representative of the primary reflection A of double amplitude; that is, it will be of double amplitude relative to the signals representative of the primary reflections $P_1$ and $P_2$ inasmuch as the counter 72 returns the switch $S_1$ to its illustrated position prior to the time these reflection signals appear at the output of the amplifier 35. By thus doubling the amplitude of the primary reflection giving rise to the summation multiple F, there will be generated by the corrective circuit a cancellation signal of double amplitude, and thus there will be a cancellation of the summation multiple F as it appears at the summation amplifier 35. It is to be noted that while the primary A does not have a pickup head associated with the drum 41, nevertheless the summation multiples of consequence arising therefrom are cancelled in accordance with the present invention and as illustrated in the system of FIG. 3.

Figure 5:
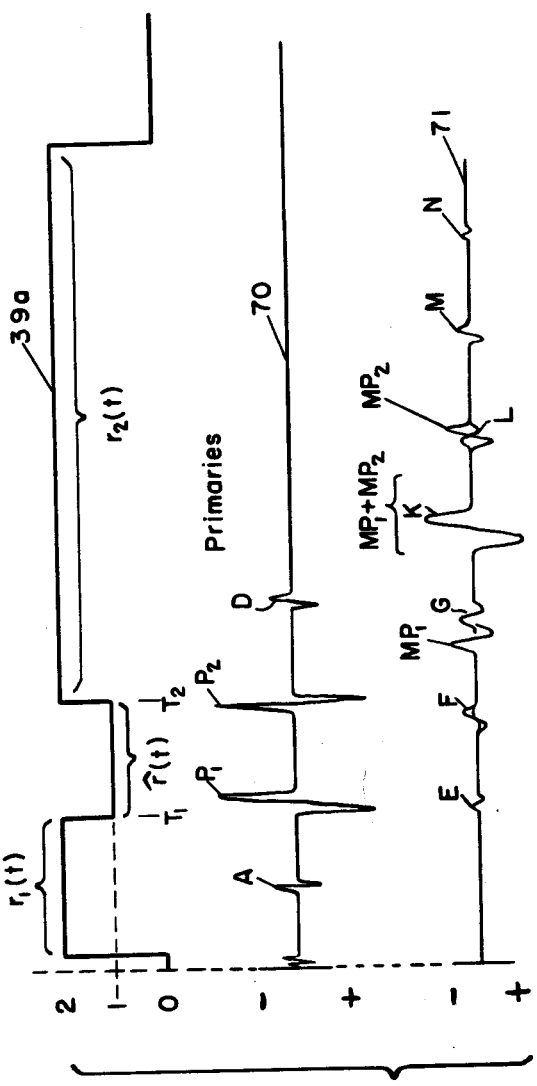

The above explanation likewise applies to the additional summation multiples G, L and M, illustrated in FIGS. 4 and 5, it being understood that the function switch $F(t)$, and particularly the switch $S_1$ thereof, will be operated to provide the double amplitude signals representative of the respective primaries giving rise to the summation multiples G, L and M. It may be further noted that the multiple N has an amplitude similar to the multiple E and hence of such low order that it can for all practical purposes be neglected. Should there arise in practice a multiple of consequential magnitude which will not be eliminated by the system of FIG. 3, it is then clear that an additional pickup head will be added to eliminate it in the manner described above.

In FIG. 5 there appears a timing curve 39a for the $F(t)$ assembly 39. Initially it will be noted that the circuit is open. The counter 59, as above described, closes the switch $S_2$ and concurrently the counter 72 operates the switch $S_1$ to apply input signals from the attenuator 56 to the recording head 40 with a gain factor of two. This gain factor applies until just prior to the appearance at recording head 40 of the first primary $P_1$. Since a gain factor of unity for the input signal is required for the cancellation of multiples due to primaries having corresponding pickup heads associated with drum 41 of FIG. 3, the return of switch $S_1$ to its illustrated position reduces the input signal by one-half. This reduced signal-setting for the attenuator 56 continues until after the arrival of the last primary $P_2$ having a pickup head associated with drum 41. Then the counter 72 returns the switch $S_1$ to its uppermost position again to double the amplitude of the input signals and thus to provide for the cancellation of the later-arriving summation multiples L and M, the summation multiple G having been cancelled in like manner as described above for the summation multiple F.

Though the general case is yet to be described, it will nevertheless now be helpful to define the term $r(t)$ as one representing a function corresponding with the reflection coefficient of the earth versus two-way travel time. Stated differently, the function $r(t)$ expresses or sets forth that property of the earth which produces reflections. Thus there will be a function $r(t)$ for the whole of the seismogram. As already noted in the idealized example of FIGS. 1 and 2, only a part of the seismogram as a whole has been utilized in connection with the corrective circuit of FIG. 3. Accordingly, for that part of the seismogram utilized in the operation of the system of FIG. 3 (and in the idealized example of FIGS. 1 and 2 that part of the seismogram having present therein first order surface multiples), a part only of the reflectivity function $r(t)$ will be utilized and that selected part will hereinafter be designated $\hat{r}(t)$. For the idealized case of FIG. 1, and remembering that the seismogram $S(t)$ of FIG. 2 as described contains only primary reflections and first order surface multiples, then an approximate expression for that seismogram may be written as follows:

$$S(t)=b(t)*\hat{r}(t)-R_0b(t)*C(t)*\hat{r}(t)*\hat{r}(t) \qquad (1)$$

where:

$S(t)$ = seismogram containing only primary and FOSM (first order surface multiples);
$b(t)$ = a seismic filtering function which is a combination of the shot impulse and attenuation effects including instrument filtering;
\* denotes convolution, for example the function $0(t)$ resulting from the convolution of a function $g(t)$ with a function $f(t)$ will mathematically be:

$$0(t)=g(t)*f(t)=\int_0^t g(\tau)f(t-\tau)d\tau$$

where, $0(t)$ is the function resulting from the convolution of $g(t)$ with $f(t)$; and $t=$time and $\tau$ (tau) = the delay time.

$\hat{r}(t)$ = the selected portion of the reflectivity function $r(t)$ of the earth at a location being investigated by seismographic analysis;
$R_0$ = surface reflection coefficient;
$C(t)$ = modifying function due to strata at a given locale; and
$b(t)*C(t)$ = multiple reflection filtering function.

With primary reflections designated $P(t)$, then from a study of synthetic seismograms it is known that the following equation applies:

$$P(t)=b(t)*r(t) \qquad (2)$$

Since the term $b(t)$ includes in its definition the attenuated shot pulse, the waveform from the shotpoint can be visualized as traveling downwardly and, through the process of a single reflection from a series of reflecting interfaces, emerges at the surface as $b(t)*r(t)$. This new function $P(t)$ resulting from the convolution of $b(t)$ with $r(t)$ at the surface gives rise to reflection downwardly from the surface of seismic energy. The waveform at the surface is altered by the factor $R_0$ and its polarity, of course, reversed. A negative sign is taken to represent downward reflection of upwardly traveling seismic energy.

This new waveform represented by $[-R_0b(t)*r(t)]$ moves downwardly through the section, is modified in the same way as the original, meaning it is convolved with $r(t)$ and thus gives rise to a waveform represented by the term $[-R_0b(t)*r(t)*r(t)]$. This term of Equation 1, except for the factor $C(t)$, is representative of first order surface multiples.

The foregoing reasoning may be extended to produce additional terms for surface multiples of higher order, as well as internal multiples. These will be later discussed.

The reason the function $C(t)$ is included in the above expression has been explained above in connection with the determination and operation of the filter 54 of FIG. 3. The need for the inclusion of the function $C(t)$ is believed due to the fact the surface multiples pass through the near surface layers, including the weathered layer, more times than do the primary reflections. The near surface layers will, in general, act as an attenuator of the higher frequencies to a greater degree than the consolidated layers and, hence, the multiples will be filtered to a greater extent than the primaries. As already set forth, the low pass filter when properly adjusted compensates in the cancellation signals for the loss of high frequencies from the multiples as compared with the loss of high frequency components from the primaries.

It may be further observed that all of the terms of Equation 1 have been taken into account in the system of FIG. 3, that the right-hand term of Equation 1 is the term definitive of the multiples, and that the corrective circuit provides a solution of Equation 1 in the form of cancellation signals for removal of the multiples. Thus the utilization of the times $t_1$ and $t_2$ in the setting of the pickup heads 42 and 43 as described above provides the time-domain filtering needed for the convolution operations indicated by Equation 1. More particularly, the introduction of primaries $P_1$ and $P_2$ to the corrective circuit by way of the recording head 40 and the operation of the time-domain filter 58 together with the reversing switches 44 and 45 and the amplitude adjusting amplifiers 46 and 47, performs the steps of convolving the primary reflections with $\hat{r}(t)$, the function $b(t)$ being inherently present in the primary reflections. Thus at the output of the summing amplifier or adder 50, the signal will correspond with $b(t)*\hat{r}(t)*\hat{r}(t)$. The other two terms of the right-hand side of Equation 1 ($R_0$ and $C(t)$) are introduced in the manner explained above by the amplifier 53 and the $C(t)$ filter 54. Thus the system of FIG. 3 provides a solution for the right-hand term of Equation 1 and produces the cancellation signals needed for the removal of the $\hat{r}$ multiples.

With the above understanding of Equation 1, the manner in which the more general equation may be applied will become self-evident after it has been applied to the idealized but more complicated case as illustrated in FIGS. 4 and 5. Thus the general equation may be written:

$$S(t) = b(t) * r(t) - R_0 b(t) * C(t) * r(t) * r(t) \quad (3)$$

where $r(t)$ is now equal to the reflectivity function of the earth which gives rise to all of the primary reflections on the seismogram. In connection with FIGS. 4 and 5, there has already been explained the operation of the $F(t)$ assembly 39 which was utilized to introduce the needed change in the relative amplitudes of selected primary reflections as recorded on the tape of drum 41 to produce cancellation of their multiples. These functions will be better understood by reference to Equations 7–9 now to be derived. Since $\hat{r}(t)$ was defined above for the idealized case of FIGS. 1 and 2, a different reflectivity function will, of course, be applicable during the time interval in which there are produced primary reflections prior to the first of the $\hat{r}$ primary reflections. Thus as shown in FIG. 5, the reflectivity function $r_1(t)$ will be applicable during the corresponding portion of the switching cycle as indicated at $r_1(t)$. The reflectivity function $\hat{r}(t)$ applies during the next section of the seismogram and as indicated by the bracket labelled $\hat{r}(t)$. Finally, the reflectivity function $r_2(t)$ will apply for the remaining portion of the seismogram during which additional multiples are to be removed and until, of course, the switch $S_2$ has been operated by counter 59 again to open its contacts to interrupt the circuit by way of conductor 57 of recording head 40. By inspection of FIG. 4, it will be clear that $r(t)$ will be equal to the sum of the selected reflectivity functions, i.e., $$r(t) = r_1(t) + \hat{r}(t) + r_2(t) \quad (4)$$

From Equations 3 and 4 there may be written:

$$S(t) = b(t) * r(t)$$
$$- R_0 b(t) * C(t) * [r_1(t) + \hat{r}(t) + r_2(t)]$$
$$* [r_1(t) + \hat{r}(t) + r_2(t)] \quad (5)$$

or $$S(t) = b(t) * r(t) - R_0 b(t) * C(t)$$
$$* [r_1(t) * r_1(t) + r_2(t) * r_2(t) + 2r_1(t) * r_2(t)$$
$$+ 2\hat{r}(t) * r_1(t) + \hat{r}(t) * \hat{r}(t) + 2\hat{r}(t) * r_2(t)] \quad (6)$$

In Equation 6 the terms which do not include $\hat{r}(t)$ give rise to such multiples as the multiples E and N of FIG. 5 and which have amplitudes of a negligible order and for that reason can be neglected. Thus retaining in Equation 6 only the terms which include $\hat{r}$, the following equation is obtained:

$$S_1(t) = b(t) * r(t) - R_0 b(t) * C(t) * r(t)$$
$$* [2r_1(t) + \hat{r}(t) + 2r_2(t)] \quad (7)$$

or $$S_1(t) = b(t) * r(t) - R_0 b(t) * C(t) * r(t)$$
$$* F(t) r(t) \quad (8)$$

The $F(t)$ multiplying function in Equation 8 is given by $$F(t) = 2u(t) - u(t - T_1) + u(t - T_2) \quad (9)$$

where $u(t)$ is the unit step function which in the example illustrated in FIG. 4 had first a value of zero then 2, then 1, then 2, and over the time intervals there illustrated. $T_1$ and $T_2$ are the times at which function switch 39 is operated to change the attenuation of signals to be recorded on drum 41. It is for the foregoing purposes that the function switch $F(t)$ performs the operations specified by Equation 9 and illustrated by graph 39a of FIG. 5.

In the idealized cases illustrated in FIGS. 1–2 and 4–5, there were present reflecting interfaces responsible for multiples of large magnitude as compared with the remaining multiples on the seismogram. For the general case there will likely be present multiples of significant magnitude over portions of the seismogram of much greater length than that part considered in FIGS. 1–2 and 4–5.

Figure 6:
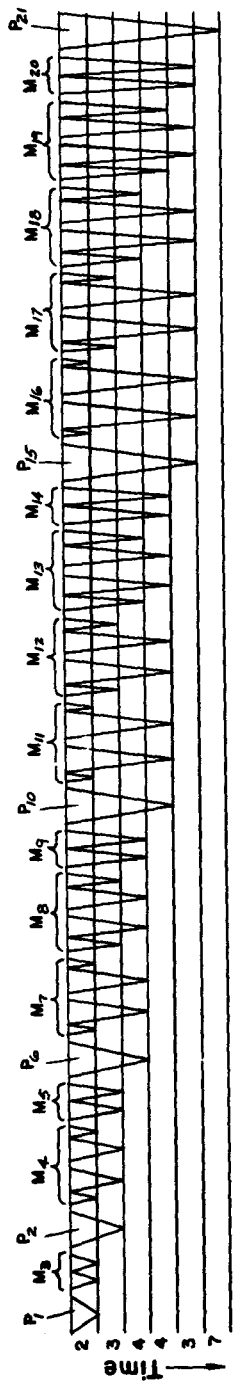
FIG. 6 illustrates a section of the earth's surface together with additional ray paths of seismic energy.
Figure 7:
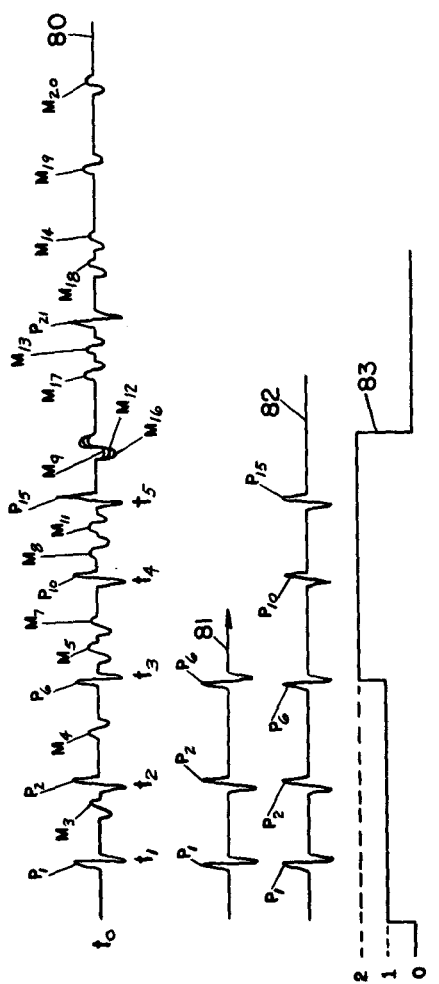
FIG. 7 illustrates selected waveforms due to the detection of seismic energy at certain of the ray paths of FIG. 6 and also includes a switch-timing diagram.

As illustrated in FIGS. 6 and 7, a seismogram 80 may have present many multiples of significant magnitude and without having present many, or any, multiples of disproportionately large magnitude compared with the others. For example, the multiples $M_3$, $M_4$, $M_5$, $M_8$, $M_{11}$, $M_9$, $M_{12}$, $M_{16}$, $M_{13}$, $M_{14}$ and $M_{17}$ to $M_{20}$ have been illustrated as of substantially the same amplitude though in practice they may differ somewhat from each other. The primary reflections have also been illustrated by the waveforms $P_1$, $P_2$, $P_6$, $P_{10}$, $P_{15}$ and $P_{21}$. For the situation illustrated in FIGS. 6 and 7 there will be utilized the present invention including a repetitive or iterative operation. The $F(t)$ assembly 39 of FIG. 3 will again be utilized, initially to eliminate from the recording head 40 the direct traveling waves ($b(t)$ of FIG. 2) and to apply thereto the primary reflections for which there may be established the applicable reflectivity functions. As shown in FIG. 7, these will be the first-occurring, successively-appearing primary reflections as, for example, $P_1$, $P_2$ and $P_6$. Accordingly, the drum 41 will be provided with three pickup heads, one for each of the primary reflections $P_1$, $P_2$ and $P_6$, and each angularly adjusted so that the times $t_1$, $t_2$ and $t_3$ will meet the requirements above described and particularly in reference to the appearance of the multiples resulting from these primary reflections. With the primaries $P_1$, $P_2$ and $P_6$ then applied to the tape of drum 41, there will be generated the needed cancellation signals to remove the multiples throughout the seismogram up to the time $2t_3$ (this will include the multiples $M_3$, $M_4$, $M_5$, $M_7$ and $M_8$). The ray paths for these multiples have been illustrated in FIG. 6. The determination of the parameters for the time-domain filter 58 and the associated components representing the reflectivity function may be ascertained by either of the methods illustrated in FIG. 2, as by taking them from the seismogram or by utilizing the information available from a velocity log transformed to two-way travel time in the manner described above. A synthetic velocity log may be obtained from the information on the seismogram itself by utilizing the techniques of inverse filtering as fully described in co-pending application Serial No. 668,569, filed June 27, 1957, by Philip L. Lawrence, now Patent No. 3,076,177, and assigned to the same assignee as the present invention.

Having thus removed the multiples over the initial portion of the seismogram, equal to the time of $2t_3$, there may now be utilized additional primary reflections which may have been obscured by the multiples which have been removed. For clarity, such obscuring effects have not been illustrated for the primaries $P_{10}$ and $P_{15}$ which may then be utilized with additional pickup heads in association with drum 41. The seismogram will then be again reproduced by the pickup head 31 of FIG. 3 and applied through the F(t) assembly 39 to the drum 41. In this manner there will be removed all multiples over that period of the seismogram corresponding with the time of $4t_3$. This includes that portion of the record corresponding with $2t_5$ and also a further portion because of the absence of reflectors having primary reflections of any significant amplitude in that portion of the seismogram between the primary reflections $P_{15}$ and time $2t_3$.

The foregoing process will be repeated after clearing the record of multiples throughout the time $4t_3$ until the whole of the seismogram has been treated. Thus there will be obtained a multiple-free seismogram 82, FIG. 7, on which there appear the primaries $P_1$, $P_2$, $P_6$, $P_{10}$ and $P_{15}$ as well as the additional primaries $P_{21}$, etc., not illustrated. Further in connection with the iterative process, the F(t) assembly 39 is operated by the counters 59 and 72 in accordance with the timing diagram 83 of FIG. 7, with the understanding that the switching from level 1 to level 2 occurs just after the appearance of the last primary reflection whose reflection coefficient is included on drum 41.

Higher Order Surface Multiples

Referring now to FIG. 8, there has been illustrated in idealized form a plurality of second order surface multiples which for the moment will be taken as the multiples within the bracket 88 which have the two-surface bounces, two at one of the significant interfaces 11 and one at a less important interface, such as the interface 50 having a velocity-density contrast of low order.

Referring now to FIG. 9, there has been illustrated the system of FIG. 3 but with the addition thereto of further circuit arrangements, one for the development of cancellation signals for second order surface multiples. The latter circuit extends from the output of the summing amplifier 35 by way of conductors 91 and 91A to a second, $F_2(t)$ function assembly 39A and thence to a delay line or time-domain filter 58A, an amplifier 53A for the factor $R_0$ squared (see Equation 11 appearing hereinafter), a low-pass filter 54A for the function $C_2(t)$ and to the summing amplifier 35. The described additional circuit for generating the additional cancellation signal is quite similar to the one described in connection with FIG. 3. In fact, the arrangement of FIG. 3 as incorporated into FIG. 9 operates in precisely the manner described above for the removal of the first order surface multiples though minor circuit changes have been made. For the additional circuit, the parameters needed for the operation of the time-domain filter or delay line 58A will be obtained by convolving $\hat{r}(t)$ with $\hat{r}(t)$. When this is done, there are obtained the coefficients needed for the correct positioning of the pickup heads of the delay line 58A. Thus, as shown in FIG. 10, the result of convolving two signals $A_1$ and $A_2$ occurring at the times $t_1$ and $t_2$ (as in FIG. 2) produces three signals $A_3$, $A_4$, and $A_5$ at times $2t_1$ ($t_1+t_2$), and $2t_2$. It is to be understood that the three pickup heads 43A, 43B and 43C will then be set with the angular positions from recording head 40A corresponding with the foregoing times and that the associated three amplifiers 46A, 46B and 46C will be set in accordance with the amplitudes $A_3$–$A_5$ of said signals. Though the separate delay line 58a has been shown to simplify the explanation, in practice the single delay line or time-domain filter 58 will perform both functions since it will be provided with three additional pickup heads and additional recording heads for the added pickup heads. In practice it will be preferred to have each pickup head associated with its own recording head with the recording heads preferably in alignment along the periphery of the drum and parallel to its axis. This construction is preferred since the angular spacing between adjacent pickup heads may be very small in some instances and by utilizing separate tracks on the magnetic tape there is avoided limitations on the degree of permissible separation between the adjacent pickup heads. Thus the pickup heads to be utilized for the elimination of the second order surface multiples may occupy three tracks on the tape with associated three recorder heads. As already noted, each recorder head associated with the pickup heads for elimination of second order surface multiples (the recorder head 40A in FIG. 9) will have its circuit connected to the output of the summing amplifier by way of the second $F_2(t)$ assembly 39A. The switch $S_3$ operated from a counter 59A will be utilized to perform all switching operations in conjunction with an attenuator pursuant to the timing diagram shown in the lower portion of FIG. 10 and as indicated at 95. It is to be noted that the $F_2(t)$ assembly differs from the operation of the F(t) assembly in the following ways. As shown by the timing graph 95 of FIG. 10, the switch $S_4$ in its illustrated position grounds the circuit to the delay line before and following the shot instant. After the direct traveling waves have arrived at the detector, the switches $S_3$ and $S_4$ are operated to apply the initial portion of the seismogram to the recording head 40A at triple normal amplitude and until just prior to the arrival time of the first $\hat{r}$ primary reflection. Switch $S_3$ then returns to its illustrated position for application of the normal amplitude of the input signals to recording head 40A until the termination or end of the period during which $\hat{r}$ primaries are developed. Thereafter, the amplitude of the signals applied to recording head 40A are again tripled by operation of the switch $S_3$ to its uppermost position where it remains for the remainder of the operation. For the foregoing reasons, the voltage dividers 56 and 56A have been illustrated as including three equal-valued resistors. Of course, additional multiplying amplifiers may be substituted for the attenuator-type of multiplying circuits designated F(t). Both types are well understood by those skilled in the art.

Mathematically, the foregoing requirements for the operation of the added signal-generating channel may be set forth as follows:

$S(t)$ = Primaries + FOSM
+ Second Order Surface Multiples (10)

or $$S(t) = b(t)*r(t) - R_0 C_1(t)*b(t)*\hat{r}(t)*F_1(t)\cdot r(t)$$
$$+ R_0^2 C_2(t)*\hat{r}(t)*\hat{r}(t)*F_2(t)\cdot r(t) \qquad (11)$$

It is to be noted that the difference between the general statement of Equation 10 and Equation 11 corresponding therewith but made up of its several component factors is that the term for the first order surface mutiples in Equation 11 is preceded by a minus sign. This indicates that the first order surface multiples are 180° out of phase with the primaries. It is for this reason that cancellation signals used for removal of the first order surface multiplies, though 180° out of phase with the multiples, are in phase with their primaries. Being in phase with the primary reflections, they cancel their multiples.

The last term of Equation 11 defining the second order surface multiples is preceded with a positive sign, thus indicating that the phase of the second order surface multiples is the same as their primaries. Occordingly, the delay line 58A will be adjusted to realize the function $$[\hat{r}(t)*\hat{r}(t)]$$

In this manner, the cancellation signals combine with the second order surface multiples of the seismogram in opposite phase to cancel them from the seismogram. Switches 44A–44C have been included to provide further flexibility in operation. They can be operated to their signal-reversing positions as may be required.

The amplifier 53A will not only be set for the factor ($R_0^2$) but also to take care of circuit attenuation as described for the system of FIG. 3. The parameters for the low pass filter 54A will be determined by any of the methods described for the system of FIG. 3.

Again referring to FIG. 10, it will be observed that unit impulses $A_1$ and $A_2$ have been utilized for the $\hat{r}(t)$ function and unit impulses $A_3$–$A_5$ produced as a result of convolving $\hat{r}(t)$ with $\hat{r}(t)$. With unit impulses, their time occurrences correspond precisely with the appearance of such pulses on the record. However, where, as in the seismogram of FIGS. 2, 5 and 7, the pulses have duration times materially exceeding the duration-time of a unit impulse, then the times taken from such records will be selected so that there will be applied to each recording head 40 the whole of each pulse with respect to which selections of time are made pursuant to the foregoing description.

The convolution of $\hat{r}(t)$ with $\hat{r}(t)$ will be accomplished in a manner well understood by those skilled in the art, the convolution of one function with another being a mathematical operation discussed in many textbooks on mathematics. Thus the convolution may be accomplished by hand, meaning the substitution in the applicable equation of the information available from the function $\hat{r}(t)$. The computation may be done by a computer programmed for the convolution process. Additionally, the data needed by the convolution of $\hat{r}(t)$ with $\hat{r}(t)$ can be obtained from the seismogram itself, as will be later explained.

Now that there has been explained how the first order surface multiples and second order surface multiples may be removed from the seismogram, it will be understood that surface multiples of still higher order may be removed by extending the system in the manner explained for the second order surface multiples, though in most cases such extension will be unnecessary.

Referring again to FIG. 2, it will be remembered that the times $t_1$ and $t_2$ were in the idealized cases selected directly from the seismogram. Further in discussion of the idealized cases, use was made of the fact that first order surface multiples from primary $P_1$ coming in at time $t_1$ appear at time $2t_1$. This multiple $MP_1$ is of course a multiple of large amplitude which is to be removed from the seismogram $S(t)$. In practice, the situation is much more complex than in the idealized case and the time $t_1$ between the appearance of the primary and the first order surface multiple of large amplitude to be removed may differ from the time $2t_1$ by as much as 20 or 30 milliseconds. Though this difference be small on the absolute scale, it nevertheless indicates the desirability of more accurately selecting the time $t_1$ between the appearance of the primary and the appearance of the multiple since that is when the high amplitude multiple can be removed.

Beside providing for the determination of the time $t_1$ with greater precision, the use of cross-correlation techniques will provide further and additional information useful in the operation of the system of FIG. 3. In FIG. 11 there has been illustrated a seismogram 101 which may be taken as typical of the records to which the present invention is particularly applicable. A study of this seismogram will indicate a primary reflection $P_1$ of large amplitude and a second primary reflection $P_2$ also of substantial amplitude. Where on seismograms the amplitudes are not as great as the primary reflections $P_1$ and $P_2$, they nevertheless may be identified by those skilled in the art since there will nearly always be available some information as to the nature of the high-contrast beds which give rise to the high-amplitude multiples it is desired to remove. For the cross-correlation technique, there will be selected that portion of the seismogram 102 lying between the dimensional arrows and including the primary reflections $P_1$ and $P_2$. Utilizing this section of the seismogram and cross-correlating it with the seismogram 101 as a whole will result in the production of the cross-correlation function illustrated by the record 104 of FIG. 12.

It will be noted that there appears on the cross-correlation function 104 of FIG. 12 a peak 103 of large and significant amplitude exceeding that of all of the adjacent peaks immediately preceding and following it. It is in this manner that there is determined with considerable precision the time which now may be taken as zero time for the determination of the time $t_1$ to be utilized in the setting of the pickup heads of FIG. 3. Multiples may be properly viewed as repetition of primary reflections. Accordingly, the cross-correlation function indicates that the primary reflections are repeated in the seismogram at a time approximating the time of arrival of the primary reflection (when the shot is at the surface), and this time in the cross-correlation function will appear at the time of occurrence of a negative-going signal of large amplitude. It is known to be negative-going because the reflection coefficient producing it is positive and the surface interface inverts its polarity. Thus the negative-going peak 105 is the one of greatest negative-going amplitude following the peak 103. Hence, this peak 105 defines the time at which the first order surface multiple $MP_1$ will appear on the seismogram 101 as measured from zero time ($t_0$) on the cross-correlation function. Thus this time $t_1$, shown by the dimensional arrows on the cross-correlation function 104, will be the time used for setting the pickup head 42 of FIG. 3.

Since the zone 102 of primary reflections is repeated on the seismogram as multiples due to the next lower reflecting interface, there will appear on the cross-correlation function 104 a positive-going pulse 107 which may be recognized by its increased amplitude. On the seismogram the time of appearance of the primary $P_2$ following the appearance of primary $P_1$ is known to a close approximation and this information is, of course, useful to double-check the selection of the peaks 105 and 107, the latter peak in the cross-correlation function determining with increased precision the time $t_2$ to be utilized in the setting of the pickup head 43 of FIG. 3.

Remembering that the primary reflections will be repeated again and again to produce additional multiples in the record, there will then appear in a subsequent part of the cross-correlation function 104 peaks which will determine with considerable precision the times needed for adjustment or setting the time-domain filter 58A, FIG. 9, for the removal of the second order surface multiples. As explained above, it is known to a close approximation that a second order surface multiple will appear at approximately time $2t_1$, and thus on the correlation function the positive-going peak 108 appears at approximately twice the time $t_1$. Thus the time occurrence of the peak 108 relative to peak 103 will be time utilized for the setting of a pickup head in the delay line 58A. The foregoing reasoning applies to assist in the selection of additional peaks. Thus the trough 109 will appear at approximately the time $t_1+t_2$ on the cross-correlation function and the time utilized in the delay line 58A for a second pickup head will be the time occurrence of the trough 109 on the cross-correlation function from zero time, $t_0$. Similarly, at time $2t_1$ the peak 110 will be selected for determination of the setting of the third pickup head of the delay line 58A. It is in this manner that there will be generated with greater precision the corrective signals needed to remove both the first and the second order surface multiples from the seismogram. By using time-settings for the delay lines 58 and 58A determined from actual times, deviations due to variations in the earth's strata are taken into account, these variations causing some departure from mathematically determined times, for example, $2t_1$ mathematically always equals twice $t_1$, but, as shown, the multiple of the primary occurring at $t_1$ may appear at a time approximately $2t_1$ but not exactly at that time.

The cross-correlation function besides providing time information with somewhat greater precision than the taking of values from the seismogram itself, also provides greater precision in respect to the amplitude functions $A_1$ and $A_2$ of FIG. 2, and in respect to functions $A_3$–$A_5$ of FIG. 10. In FIG. 3 the amplifiers 46 and 47 in conjunction with the reversing switches 44 and 45 introduce into the corrective circuit factors taking into account both magnitudes and polarities. If the amplitude from trough to peak of the signal 103 be taken as a reference or normalized value, then corresponding amplitudes of the peaks 105, 107, 108, 109 and 110 will be proportional to the amplitudes needed in the time-domain filter 58 of FIGS. 3 and 9 and of the time-domain filter 58A of FIG. 9 for all factors involving the products of the A values and $R_0$. Again, by reason of the fact that multiples may be considered and are repetitions of primaries, deviations in the shapes of the multiples and the primaries appear in the cross-correlation function as a difference between the shape of the peak 103 and that of the peaks 105, 107, 108, 109, and 110. Thus the cross-correlation function provides information by means of which the filters $C(t)$ and $C_2(t)$ of FIGS. 3 and 9 may be appropriately set. The information needed for the filter may be readily derived by comparison of the wave shapes through the techniques of harmonic analysis as explained above in reference to the Neufeld patent. Of course means other than that of harmonic analysis may be utilized as, for example, appropriate computations with a computer and by use of techniques similar to those described in conjunction with the oscilloscope 65. In summary, it will be seen that the cross-correlation technique as applied in accordance with the present invention results in the identification of the repetition signals corresponding with the primaries and thus differs from the usual use of cross-correlation for identification of a signal obscured by noise.

In FIG. 13 there has been illustrated a seismogram 110 in which significant reflections may be identified, though others are obscured by reason of multiples arriving at the same time as such reflections. By applying the present invention to the elimination of multiples in the manner above set forth, there will be produced cancellation signals as illustrated by the signals on trace 111. These cancellation signals when applied to the seismogram 110 results in a new multiple-free seismogram 112 and on which the reflections now appear unobscured by the multiple signals. A reflection which was wholly obscured on the field record or seismogram 110 has been identified at 113. More explicitly, in generating the cancellation signals 111, the first breaks 114 are eliminated by the $F(t)$ switches of FIGS. 3 and 9 with the reflections 115 and 116 selected for the primaries $P_1$ and $P_2$ in determination of the setting of the time-domain filter 58 for generation of cancellation signals for the removal of the multiples appearing at 117, 118, 119 and 120. In producing the record 112 of FIG. 13 there were not utilized the techniques of removing the second order surface multiples which, it will be noted, appear in the seismogram 114. Had it been desired to apply the technique of removing the second order surface multiples, then primary reflections on the seismogram 112 would have been reproduced with still greater distinctiveness.

In addition to the various kinds of multiples which have been described, others which sometimes may be of significant character arise, as for example, FIG. 14, where the seismic energy may be considered to have its first bounce at the interface 12, then a bounce at interface 11, followed by a bounce at interface 12, and thence to the detector. Multiples of this kind have many variations, as will be evident from a consideration of FIG. 14 where an additional reflecting interface 13 has been illustrated. Multiples which have at least two bounces on one or two of the significant or high-contrast interfaces may be defined as an internal multiple of the kind that it would be desirable to eliminate from the record. These may also include multiples $MP_x$ where one bounce of a multiple is at an interface other than a near-surface bed and in general below the uppermost significant interface.

Referring again to FIG. 9, by closing a pair of switches 131 and 132, there will be added to the corrective network additional corrective circuits respectively including the $F_3(t)$ and $F_4(t)$ function assemblies 39B and 39C, delay lines or time-domain filters 58B and 58C, polarity reversing switches 44D, 44E and 44F, amplifiers 53B and 53C, and filter 54B. The illustration of the delay lines 58B and 58C as separate units aids in simplifying the description, though in practice the same delay line 58 of FIG. 3 may be utilized by providing additional recording heads and pickup heads to perform the time-domain filtering required for these additional corrective circuits.

Inasmuch as the general theory for the removal of the internal multiples is quite analogous to the removal of the first order and the second order surface multiples, there may be presented at once the operation of the additional components for generating cancellation signals for the elimination from the seismogram of the internal multiples. As shown in FIG. 14, these internal multiples are characterized by three bounces, at least two of which are from one of the significant velocity-density interfaces. If the shallowest significant interface 11 first be considered and as analogous to the surface 13 in its effect upon internal multiples having one bounce at that interface, it will be seen at once that a pickup head 43D has an angular position from recording head 40B corresponding with a time equal to the difference between the time $t_m$ and $t_n$ where the time $t_n$ is the two-way travel time from the surface to interface 11 and the time $t_m$ is the two-way travel time from the surface to the interface 12. For more precise determination of the times, the cross-correlation techniques above described may be utilized.

The second pickup head 43E of delay line 58B will be set at an angular position corresponding with the difference between the two-way travel time $t_k$ to a third significant reflector and the time $t_n$. For the corrective circuit being described, there will be at least once bounce from the interface 11. This means that the polarity of the internal multiple will be negative on the assumption that there is a change from a low-velocity-density material to a high velocity-density material in the downward direction at interface 11. Accordingly, the amplifier 53B will have the input applied thereto with such instantaneous polarity or phase to generate a positive-going corrective signal to cancel out the negative going internal surface multiple from the seismogram. The amplitude settings of the amplifiers 46B and 46E associated with each of the pick-up heads will be made in the same manner as earlier described. The amplifier 53B will include a gain-control with a setting thereof which takes into account the reflectivity factor of the interface 11. While the filter 54B for the function $C_3(t)$ may not be necessary for the internal multiples, it has been illustrated since the above-developed theory remains applicable here. It is to be noted the order of performance of the steps needed to conform with the terms of the applicable equation need not be in the order described for the previously described signal-generating circuits. Thus amplifier 53B precedes the filter 54B instead of following it.

Though additional circuits for the generation of additional cancellation signals may be provided, the final circuit of FIG. 9 includes only the single pickup head 43F utilized for removal of multiples involving the interfaces 12 and 13 of FIG. 14. More particularly, the pickup head 43F is set to an angular position relative to recording head 40C corresponding with the difference between the time $t_k$ and the time $t_m$, FIG. 14. The amplifier 53C is set to take into account the effective reflectivity coefficient of the beds 12 and 13. In this circuit the low pass filter has been omitted on the basis of a value of the function $C_4(t)$ of insignificant magnitude.

There remains to be described the function assemblies 39B and 39C for the respective functions $F_3(t)$ and $F_4(t)$. Analogous to the system of FIG. 3, the switch 39B is operated by the counter 59A to remain open (meaning that the input to the delay line 58B is grounded) until after the appearance at the pickup head of the first primary $P_n$ also utilized in the elimination of the first order surface multiples. At that time, the switch $S_6$ will close to complete the connection through switch $S_5$ to the attenuator for application to the recording head of the normal amplitude of the input signals, this position being maintained until the last primary reflection utilized in the delay line 58B for the elimination of the first order internal multiples has been applied to the recording head 40B. At that time, the switch $S_5$ is operated to change its connection to the attenuator to double the amplitude of the input signals to the delay line 58B. The input signals of doubled amplitude continue to be applied to the delay line 58B until the end of the record.

The function switch $S_8$ remains open (the recording head 40C grounded) until after the primary reflection from the bed 12 has been applied to the recording head 40C, at which time it closes to apply the normal amplitude of the seismographic signals to the delay line 58C for a time continuing until the primary reflection from the third reflecting interface 13 appears and is recorded. At that time the switch $S_7$ operates to double the amplitude of the input to the delay line 58C and this position is maintained to the end of the record.

Though a detailed analysis may be presented to illustrate in manner similar to FIGS. 6 and 7 the complex character of the many internal multiples which will be removed and the manner of their removal, it is believed that the background theory and the illustrations already given will suffice and make clear to those skilled in the art the effectiveness of these additional signal-generating cancellation circuits which have just been described.

What is claimed is:

1. The method of removing from a seismogram multiple reflections of seismic energy originating from subsurface reflecting interfaces located below a source of generation of said seismic energy which comprises generating cancellation signals by convolving selected portions of said seismogram following the first breaks of said seismogram with a reflectivity function of character giving rise to said multiples, said reflectivity function being determined by the magnitudes of the velocity-density contrasts of said interfaces and by time delays corresponding, to a close approximation, with the time occurrences of said multiple reflections on said seismogram relative to their associated primary reflections, modifying the results of said convolution by two factors, first a surface reflectivity coefficient and second a further convolution of the results of said first-mentioned convolution with a function of character representative of the difference between the filtering action of the earth on the seismic energy giving rise to the respective primary reflections and the filtering action of the earth on the seismic energy giving rise to said multiple reflections, and continuously applying said cancellation signals to said seismogram in phase opposite to and in time coincidence with said multiple reflections thereby to produce a multiple-free seismogram.

2. The method of claim 1 in which said convolution of said selected portions of said seismogram includes at least that portion during which there appear the primary reflections giving rise to first order surface multiples and in which there is also convolved a further portion of said seismogram during which there appear primary reflections giving rise to summation multiples, and convolving said further portion of said seismogram with the seismic signals appearing during said further portion of said seismogram with the amplitude thereof at least doubled, thereby to generate cancellation signals for said summation multiples.

3. The method of claim 1 in which said multiple reflections of seismic energy include one bounce from a near-surface interface and two bounces from one or more of said subsurface reflecting interfaces, a selected portion of the reflectivity function of the earth at a location being investigated giving rise to such multiples being designated $\hat{r}(t)$ and in which said reflectivity function $\hat{r}(t)$ is convolved with $\hat{r}(t)$.

4. The method of claim 1 in which multiple reflections of seismic energy include one bounce from a surface or near surface interface and two bounces from one or more of said subsurface reflecting interfaces, a selected portion of the reflectivity function of the earth at a location being investigated giving rise to such multiples being designated as $\hat{r}(t)$ and in which said reflectivity function $\hat{r}(t)$ is convolved with $\hat{r}(t)$ for the production of signals of given amplitudes occurring at differing times, convolving selected portions of said seismogram with time delays corresponding with the time appearance of said signals resulting from said convolution of $\hat{r}(t)$ with $\hat{r}(t)$ with the signal-amplitudes tripled for producing cancellation signals modifying said cancellation signals by an amount proportional to the square of a surface reflectivity coefficient, removing a selected portion of the high frequency content from said modified signals, and applying said modified cancellation signals to said seismogram in phase opposite to and in time coincidence with signals representative of multiple reflections having two bounces at the surface or near surface interface and at least three bounces from subsurface interfaces, at least two of said last-named bounces being from one or more of interfaces having velocity-density contrasts of significant magnitude.

5. The method of removing from a seismogram multiple reflections of seismic energy originating from subsurface reflecting interfaces located below a source of generation of said seismic energy which comprises generating cancellation signals by time-domain filtering selected portions of said seismogram following the first breaks of said seismogram to convolve therewith a reflectivity function of character giving rise to said multiples, said time-domain filtering characteristics being determined by the relative magnitudes of the velocity-density contrasts of said interfaces and by time delays corresponding, to a close approximation, with the time occurrences of said multiple reflections on said seismogram relative to their associated primary reflections, modifying the output from said time-domain filtering by two factors, first a surface reflectivity coefficient and second a convolution of said modified output with a function of character representative of the difference between the filtering action of the earth on the seismic energy giving rise to the respective primary reflections and the filtering action of the earth on the seismic energy giving rise to said multiple reflections, and continuously applying said cancellation signals to said seismogram in phase opposite to and in time coincidence with said multiple reflections thereby to produce a multiple-free seismogram.

6. The method of removing from a seismogram multiple reflections of seismic energy originating from subsurface reflecting interfaces located below a source of generation of said seismic energy which comprises generating cancellation signals by time-domain filtering selected portions of said seismogram following the first breaks of said seismogram to convolve therewith a reflectivity function of character giving rise to said multiples, said time-domain filtering operation being determined by the relative magnitudes of selected primary reflections representative of each velocity-density contrast of said interfaces and by time delays corresponding, to a close approximation, with the time occurrences of said multiple reflections on said seismogram relative to their associated primary reflections, prior to said time-domain filtering adjusting the relative amplitudes of signals representative of the waveforms of said seismogram for time-domain filtering with increased amplitude of those portions of said seismogram which contain primary reflections other than said selected primary reflections and with relatively decreased amplitude of the portion of said seismogram including said selected primary reflections, modifying the output from said time-domain filtering by two factors, first a surface reflectivity coefficient and second a convolution of said modified output with a function of character representative of the difference between the filtering action of the earth on the seismic energy giving rise to the respective primary reflections and the filtering action of the earth on the seismic energy giving rise to the multiples of said primary reflections, and continuously applying said cancellation signals to said seismogram in phase opposite to and in time coincidence with said multiples thereby to produce a multiple-free seismogram.

7. The method of claim 6 in which said multiple reflections of seismic energy are selected to include those which have one bounce from a surface or near surface interface and two bounces from one or more of said subsurface reflecting interfaces, a selected portion of the reflectivity function of the earth at a location being investigated giving rise to such multiples being designated as $\hat{r}(t)$ and in which said reflectivity function $\hat{r}(t)$ is convolved with $\hat{r}(t)$ for production of signals of given amplitudes occurring at differing times, generating cancellation signals by time-domain filtering of selected portions of said seismogram to convolve therewith the function of character $(\hat{r}(t)*\hat{r}(t))$ giving rise to second order surface multiples which have two bounces from the surface or near surface interface and at least three bounces from subsurface interfaces, at least two of said last-named bounces being from one or more interfaces having velocity-density contrasts of significant materials, said last-named filtering operation being determined by said magnitudes and the time occurrences of signals produced by said convolution of $\hat{r}(t)$ with $\hat{r}(t)$, prior to said last-named time-domain filtering adjusting the relative amplitudes of signals representative of said primary reflections and multiple reflections on said seismogram for said last-named time-domain filtering so that the amplitude of the signals representative of portions of said seismogram which contain primary reflections other than said selected primary reflections are tripled, modifying the output from said additional time-domain filtering by two factors, first the square of a surface reflectivity coefficient, and second a convolution of said last-named modified output with a function representative of the difference between the filtering action of the earth giving rise to second order surface multiples and the filtering action of the primaries producing said second order surface multiples, and additionally applying said last-named cancellation signals to said seismogram in phase opposite to and in time coincidence with the appearance on said seismogram of said second order surface multiples.

8. The method of claim 7 in which there are eliminated from said seismogram internal multiples characterized by two bounces from two velocity-density interfaces having high reflectivities and one bounce from one of said interfaces or from another interface of less significant contrast comprising time-domain filtering of selected portions of said seismogram to convolve therewith a reflectivity function of character giving rise to said internal multiples, said last-named filtering operation being determined by the magnitudes of signals representative of primary reflections giving rise to said internal multiples and by time delays corresponding, to a close approximation, with the difference between the two-way travel time from a near one of said significant interfaces and the two-way travel time from the next remote significant interface, modifying the output from said time-domain filtering in amount corresponding with the reflectivity coefficient of the significant interface nearest the surface, and continuously applying said modified signals to said seismogram in phase opposite to and in time coincidence with said internal surface multiples, thereby to produce a seismogram also free of internal multiples.

9. The method of removing from a seismogram second order surface multiples originating by reason of two bounces or reflections of seismic energy from a surface or near surface interface and three bounces from one or more of subsurface reflecting interfaces having velocity-density contrasts of significant magnitude, which comprises generating cancellation signals by time-domain filtering selected portions of said seismogram following the first breaks of said seismogram to convolve therewith a reflectivity function of character giving rise to said multiples, said filtering operation being determined by the magnitudes of signals resulting from the convolution of $\hat{r}(t)$ with $\hat{r}(t)$ where $\hat{r}(t)$ is a selected portion of the reflectivity function of the earth at a location being investigated giving rise to first order surface multiples characterized by one bounce of seismic energy from the surface or near surface interface and two bounces from one or more of said reflecting interfaces of said significant velocity-density contrast, said filtering operation further being determined by time delays corresponding, to a close approximation, with the time occurrences of said signals resulting from said convolution of $\hat{r}(t)$ with $\hat{r}(t)$, prior to said time-domain filtering adjusting the relative amplitudes of signals representative of waveforms of said semismogram for said time-domain filtering with increased amplitude of those portions of said seismogram which contain primary reflections other than those arising from said reflectivity function of $\hat{r}(t)$, modifying the results of said convolution by an amount which takes into account the effect of the surface reflectivity coefficient, and continuously applying said modified signals to said seismogram in phase opposite to and in time coincidence with the appearance thereon of said second order surface multiples, thereby to produce a seismogram free of said second order surface multiples.

10. The method of removing from a seismogram multiples originating from at least two subsurface reflecting interfaces located below a source of generation of said seismic energy and characterized by three bounces at least two of which are from said interfaces having significant velocity-density contrasts, which comprises generating cancellation signals by time-domain filtering selected portions of said seismogram following the first breaks with a reflectivity function of character giving rise to said multiples, said filtering operation being determined by the magnitudes of selected primary reflections representative of said velocity-density contrasts of said interfaces and by time delays corresponding, to a close approximation, with the difference between the two-way travel time from the interfaces between which at least two of said three bounces occur, prior to said time-domain filtering tripling the amplitudes of signals representative of the waveforms of those portions of said seismogram which contain the primary reflections giving rise to said multiples and with relatively normal amplitudes of the signals from the remaining portion of said seismogram, modifying the output from said time-domain filtering in proportion to the effective reflectivity coefficient of the uppermost one of said interfaces, and continuously applying said cancellation signals to said seismogram in phase opposite to and in time coincidence with said multiples thereby to produce a seismogram free of said multiples.

11. A system of removing from a seismogram multiple reflections of seismic energy originating from subsurface reflecting interfaces located below a source of generation of said seismic energy, comprising means including a summing amplifier for generating signals proportional in amplitude and time to primary reflections appearing on said seismogram, a time-domain filter including a recording medium and recording means for applying said signals to said medium, pickup heads in number corresponding with the number of primary reflections from said interfaces having significant velocity-density contrasts each spaced from said recording means by amounts proportional to the time interval between a primary reflection from one of said subsurface interfaces and the time appearance of a multiple due to that primary reflection, amplifying means for each said recording head for amplifying the signal detected by the associated pickup head by an amount proportional to the amplitude of its corresponding primary reflection whereby selected signals from said seismogram are convolved with a reflectivity function of character which gives rise to said multiples, a second summing amplifier combining said signals from said pickup heads to produce summation signals, filtering means for modifying said summation signals to correspond with the waveforms of said multiples as appearing on said seismogram, and means including said first-named summing amplifier for applying said modified signals in phase opposite to and in time coincidence with signals from said seismogram representative of said multiple reflections to produce a seismogram free of said multiple reflections.

12. The system of claim 11 in which said filtering means comprises a low pass filter, said filter having components which are adjustable to vary the extent of removal of high frequencies from said summation signals.

13. The system of claim 12 in which there is connected between each said pickup head and said second summing amplifier circuit-reversing means for predetermining the instantaneous polarities of the signal applied to said second summing amplifier as produced by said pickup heads.

14. The system of claim 13 in which there is provided an oscilloscope having a plurality of input channels, an input circuit extending from one said input channel to the input of said first-named summing amplifier for display of said seismogram by said oscilloscope, a circuit extending from another one of said channels to the output of said filtering means for display of said modified signals whereby said components of said low pass filter may be adjusted to modify the waveform of said modified signals closely to correspond with the waveform of said multiple reflections, said circuit-reversing means providing for the addition of said modified signals to said signals from said seismogram with instantaneous polarities for cumulative addition, thereby to facilitate adjustment of said components of said low pass filter to bring said waveforms of said multiple reflections and said cancellation signals into correspondence.

15. The system of claim 11 in which there is provided between said first-named summing amplifier and said recording means signal-attenuating means, switching means connected between said recording means and said attenuating means for changing the amplitudes of signals from said seismogram as applied to said recording means, and means responsive to the time occurrence of signals on said seismogram for operating said switching means for application to said recording means of selected signals from said seismogram at doubled amplitude.

16. The system of claim 15 in which there is connected between each said pickup head and said second summing amplifier circuit-reversing means for predetermining the instantaneous polarities of the signals applied to said second summing amplifier as produced by said pickup heads.

17. The system of claim 11 in which there is provided a second channel for generation of additional corrective signals, said last-named channel including in series-circuit therein attenuation means, switching means for selection of predetermined amplitudes of signals developed by said attenuating means, a time-domain filter including a recording medium and recording means connected to said switching means for applying to said medium signals from said seismogram, additional pickup heads in number corresponding with convolution with themselves of primary reflection coefficients giving rise to second order surface multiples of substantial amplitude, said last-named pickup heads being spaced from said recording means by amounts proportional to the amplitudes and time occurrences of signals resulting from the convolution of functions representative of $\hat{r}(t)$ with $\hat{r}(t)$ where $\hat{r}(t)$ is defined as a selected portion of the reflectivity function of the earth at a location being investigated and determined by the setting of said pickup heads and their associated amplifying means of said first-named time-domain filter, said channel further including a circuit-reversing means for each of said last-named pickup heads and an amplifier for each of them, a summing amplifier for said individual amplifiers and said channel also including a low pass filter for generation from said seismogram of additional cancellation signals, and circuit means for applying said additional signals in phase opposite to and in time coincidence with signals representative of said second order surface multiples on said seismogram to free that seismogram of said second order surface multiples.

18. The system of claim 17 in which additional channels are provided for the generation of cancellation signals for elimination from said seismogram of multiple reflections differing from said first order and from said second order surface multiples.

19. The system of claim 11 in which said pickup heads are each spaced from said recording means by an amount directly proportional to the time interval between a primary reflection from one of said subsurface beds to the time appearance of the first significant multiple reflection due to that primary reflection with such times explicitly determined by the time occurrences of said reflections after cross-correlation of said seismogram.

20. The system of claim 18 in which said first-named pickup heads are each spaced from said recording means by an amount directly proportional to the time interval between a primary reflection from one of said subsurface beds to the time appearance of the first significant multiple due to that primary reflection with such times explicitly determined by the time occurrence of said reflections after cross-correlation of said seismogram.

References Cited in the file of this patent

UNITED STATES PATENTS

| | | |
|---|---|---|
| 2,857,567 | Jakosky | Oct. 21, 1958 |
| 3,023,966 | Cox et al. | Mar. 6, 1962 |
| 3,076,176 | Lawrence | Jan. 29, 1963 |
| 3,076,177 | Lawrence | Jan. 29, 1963 |

UNITED STATES PATENT OFFICE
CERTIFICATE OF CORRECTION

Patent No. 3,131,375                                      April 28, 1964

Robert J. Watson

It is hereby certified that error appears in the above numbered patent requiring correction and that the said Letters Patent should read as corrected below.

Column 6, line 22, for "resulting" read -- resultant --; line 32, for "appoximated" read -- approximated --; column 7, line 70, for "the", first occurrence, read -- be --; column 8, line 33, for "explicty" read -- explicitly --; line 54, for neverthless" read -- nevertheless --; column 10, line 66, for "degere" read -- degree --; column 11, line 66, last line of equation 5 should appear as shown below instead of as in the patent:

$$* \left[ r_1(t) + \hat{r}(t) + r_2(t) \right]$$

same column 11, line 71, last line of equation 6 should appear as shown below instead of as in the patent:

$$+ 2\hat{r}(t) * r_1(t) + \hat{r}(t) * \hat{r}(t) + 2\hat{r}(t) * r_2(t) \right]$$

column 12, lines 4 and 7, the first lines of equations 7 and 8 should each appear as shown below instead of as in the patent:

$$S_1(t) = b(t) * r(t) - R_0 b(t) * C(t) * \hat{r}(t)$$

column 13, line 15, for "P" read -- $P_{15}$ --; column 14, line 35, for "For-" read -- For --; line 66, for "Occordingly" read Accordingly --; column 16, line 56, after "be" insert -- the --; column 18, line 41, for "once" read -- one --; line 44, for "low-velocity-density" read -- low velocity-density --; line 51, for "46B" read -- 46D --; column 21, line 26, after "for" insert -- the --; line 36, for "materials" read -- magnitude --.

Signed and sealed this 29th day of September 1964.

(SEAL)
Attest:

ERNEST W. SWIDER                                 EDWARD J. BRENNER
Attesting Officer                                  Commissioner of Patents